United States Patent [19]

Gallagher

[11] Patent Number: 5,610,591
[45] Date of Patent: Mar. 11, 1997

[54] LIQUID LEVEL ALARM SYSTEM

[76] Inventor: Daniel J. Gallagher, 10466 Greentrail Dr. N., Boyton Beach, Fla. 33436-4412

[21] Appl. No.: 579,589

[22] Filed: Dec. 26, 1995

[51] Int. Cl.$^6$ ..................................................... G08B 21/00
[52] U.S. Cl. .......................... 340/618; 340/623; 340/625; 73/308; 116/110; 137/398; 200/84 R; 200/84 B
[58] Field of Search ..................................... 340/618, 623, 340/625; 73/308, 319; 116/110, 228; 200/84 R, 84 B, 84 C; 137/409, 398

[56] References Cited

U.S. PATENT DOCUMENTS

| | | | |
|---|---|---|---|
| 4,768,377 | 9/1988 | Habelmann et al. | 340/618 |
| 5,043,707 | 8/1991 | Heinze | 340/618 |
| 5,369,396 | 11/1994 | Kurata et al. | 340/618 |

Primary Examiner—Jeffery Hofsass
Assistant Examiner—John Tweel, Jr.
Attorney, Agent, or Firm—Richard L. Huff

[57] ABSTRACT

A liquid level alarm system which activates an alarm when liquid in a container falls below a predetermined level. The system contains an alarm which is located outside of the container. The alarm is electrically connected to an activation device which is contained within a housing. A single-pull switch arm is connected to the activation device and protrudes from the housing. One end of a line is attached to the distal end of the arm. The other end of the line is wound about a spring reel mounted on an axle connected to a float. When the surface of the liquid is between a predetermined upper and lower level, the spring reel maintains the line taut directly below the switch arm. The line is of such length that should the liquid in the container drop below a predetermined level, the float will no longer be supported by the liquid, and the weight of the float will pull the arm down to activate the alarm.

9 Claims, 2 Drawing Sheets

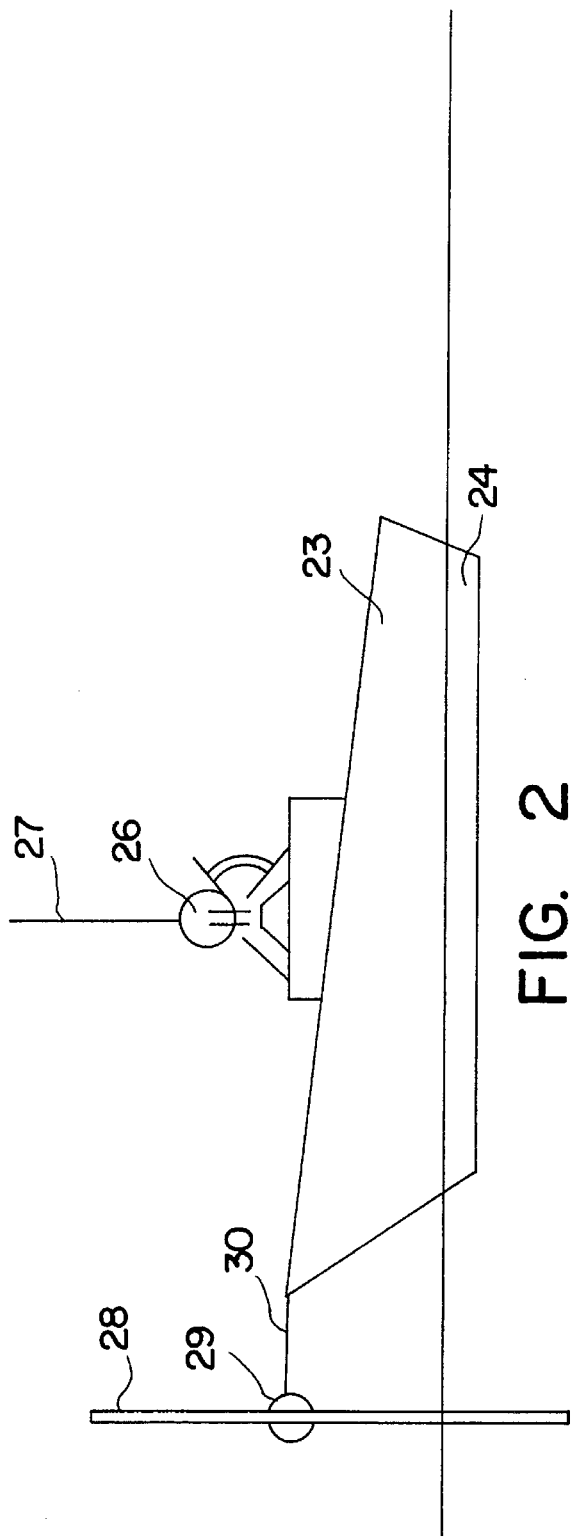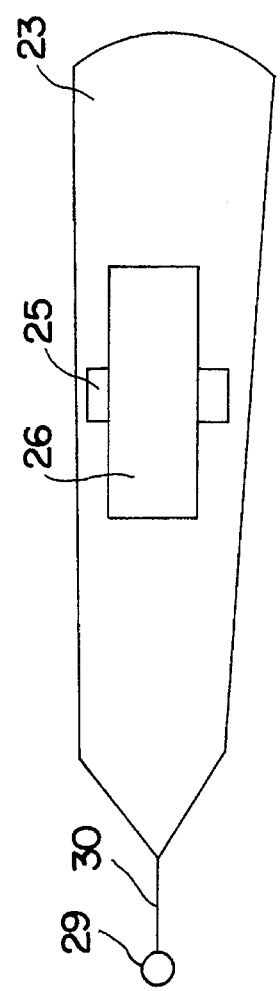

LIQUID LEVEL ALARM SYSTEM

BACKGROUND OF THE INVENTION

1. Field of the Invention

This invention is directed to an alarm system which will be activated when the liquid in a container falls below a predetermined level.

2. Description of the Related Art

The prior art is aware of devices which signal the rising of liquids in various containers above predetermined levels. French Pat. No. 2 254 016 and U.S. Pat. Nos. 4,962,370; 4,988,978; 5,006,834; and 5,028,910 are examples of such devices. Pat. No. 4,988,978 is also adapted to emit a signal when the liquid falls below a predetermined level. The device of this patent is complex and is not easily adjustable to provide for varying predetermined levels of the liquid. Also, the device is useable only when the container is fitted with the particular cover defined in the patent, and cannot be retrofitted into existing containers. U.S. Pat. No. 4,968,976 teaches an alarm kit useful for emitting an alarm when water in a container falls below a predetermined level. The alarm of this device is triggered by the pivoting of an arm against a spring to close an electrical circuit. The alarm of this device must be in the same housing as the activator for the alarm. Thus, the alarm could not be in a unified security system. The device must be mounted outside the container. Thus, the device could not be used on an outside storage tank where ice or snow would render the device inoperative. Further, the float is connected to the arm by a long, flexible line which would get wrapped around any objects in the container. Therefore, the device could not be used as an alarm system in a commode or other container which contains elements which would serve to snare the line.

SUMMARY OF THE INVENTION

One object of the present invention is to provide an inexpensive, simple alarm system which overcomes the shortcomings of the prior art. The alarm system of the present invention is simple to manufacture and easy to install. The alarm is separated from the activation mechanism. Therefore, the alarm can be incorporated into a unified security system. Also, the activation mechanism may be mounted inside or outside of the container, thus permitting the alarm system to be used in outside storage tanks as well as inside containers, such as hot water heaters or commodes. One of the benefits of the system of this invention is that it may be used on hot water heaters or commodes and, should these containers break while the buildings containing them are unoccupied, alarms in the form of unified alarm systems will be activated, and flooding of the buildings can be avoided. The float of the present invention is equipped with an axle containing a spring reel which maintains the line in a taut condition. Thus, the float will always be directly under the arm of the activation mechanism, and cannot get tangled in objects inside the container.

These and other advantages are obtained by providing an alarm system for use in a container containing a liquid, the surface level of which fluctuates between a predetermined high point and a predetermined acceptable low point. The alarm system contains an alarm means which is suitable for mounting outside the container. The system further contains a means for positioning a housing on a surface of the container above the predetermined high point of the surface of the liquid; a housing for an activation mechanism; and a single-pull switch arm which has a distal end and a proximal end and which protrudes through a side surface of the housing. Further contained in the system are a hollow float suitable for floating on the surface level of the liquid, the float containing an axle attached to the inside or outside of the float, and a spring reel mounted on the axle. A line extends between the distal end of the switch arm and the reel. There is an electrical connection between the alarm and the activation mechanism. An added, but not required, feature of the present invention is the presence of a guide rod which extends downwardly from the activation mechanism or from a point close to the activation mechanism. There is a bow hook encircling the guide bar, which bow hook is connected to the float by an arm of suitable length. This ensures the proper positioning of the float.

BRIEF DESCRIPTION OF THE DRAWING

FIG. 2 is a side view of a float of the present invention.

FIG. 3 is a top view of a float of the present invention.

DESCRIPTION OF THE PREFERRED EMBODIMENTS

Figure 1:
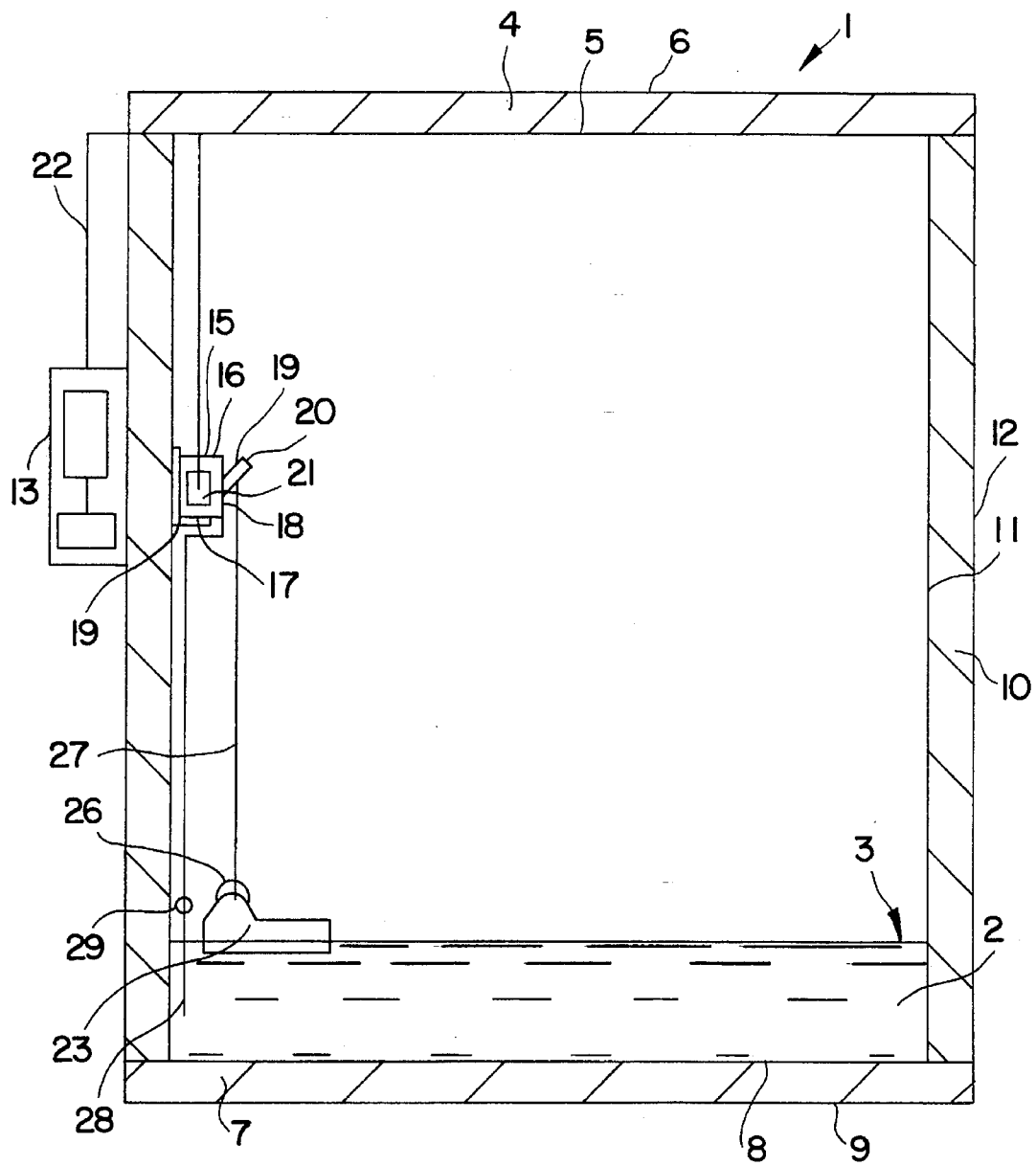
FIG. 1 is a cross-sectional view of the alarm system of this invention mounted in a container.

Referring to FIGS. 1, 2, and 3, an alarm system according to this invention is shown. A container 1 forms a reservoir which contains a liquid 2 which has a surface level 3 which fluctuates between a predetermined high point (not shown) and a predetermined low point (not shown). The container 1 has a top 4 having inner 5 and outer 6 surfaces, a bottom 7 having inner 8 and outer 9 surfaces, and at least one wall 10 having inner 11 and outer 12 surfaces. The container 1 may be made of conventional materials, such as ceramic, plastic, or metal. The size of the container 1 is unimportant in the context of the present invention, and may be adapted for use inside or outside buildings.

The nature of the liquid 2 which may be used in the present invention is broad in scope. The liquid 2 may be water when the container 1 is a hot water heater, a commode, or a storage tank. Likewise, because the to-be-described activation mechanism is hermatically sealed, the liquid 2 may be a hydrocarbon or other flammable or explosive liquid. The liquid 2 has a surface level 3 which is intended to fluctuate between a predetermined high point and a predetermined low point. The purpose of the system is to give notice when the liquid 2 falls below the predetermined low point because of normal usage or because of a rupture in or near the bottom 7 of the container.

The system contains an alarm means 13 outside the container 1. The alarm means 13 may be a bell, siren, or other audible device. Alternatively, the alarm means 13 may be a light or other visible signal. The alarm means 13 may be attached to the container 1 or may be distant from the container 1. The alarm means 13 contains the power source for the alarm system. One use of the alarm system is the incorporation of the alarm means 13 in a unified security system (not shown).

The alarm system of this invention includes a means 14 for positioning a housing 15 to the inner surface 5 or outer surface 6 of the top 4 or the inner surface 11 of a wall 10. The housing 15 is positioned above the predetermined high point of the surface level 3 of the liquid 2. The means 14 for positioning the housing 15 may be any conventional means, such as screws, bolts, Velcro, or snap-on supports. The housing 15 is a hermatically sealed container made of any conventional material, such as metal or plastic.

The housing 15 has an upper surface 16, a lower surface 17, and a side surface 18. Protruding through a side surface 18 is a single-pull switch arm 19 having proximal (not shown) and distal 20 ends.

An activation mechanism 21 is contained within the housing 15. The activation mechanism 21 contains an open electrical circuit (not shown). The single-pull switch arm 19 has a raised and lowered position. In the raised position, the circuit is open. In the lowered position, the circuit is closed. When the single-pull switch arm 19 is pulled down to the lowered position, the electrical circuit is closed, thus activating the alarm means 13 by way of an electrical connector 22 between the alarm means 13 and the activation mechanism 21. The electrical connector 22 is insulated so that there is no contact between the electrical connector 22 and the liquid 2 or any fumes from the liquid. The passage of the electrical connector from the alarm means 13 to the activation mechanism 21 may be achieved in any suitable manner. In the event the container 1 is a commode, the connector 22 may simply be passed between the top 4 and a side 10. For other containers 1, special holes may be drilled for passage of the connector 22 and sealed following passage.

As shown in FIGS. 2 and 3, the alarm system of the invention includes a float 23, which is hollow and may be of any geometrical shape, although boat-shaped, spherical and hexahedral are preferred. The float 23 contains a bottom portion 24 containing a weight (not shown). The weight serves to maintain the float 23 upright in the liquid 2 and to supply enough weight to pull the switch arm 19 to the lowered position when the float 23 is not supported by the liquid 2. An axle 25 is attached to the float 23. The axle 25 may be secured to the top of the float 23. Alternatively, the axle may be secured inside the hollow float 23, in which case there will be an opening opposite the bottom 24 of the float 23. In such case, the axle 25 is positioned approximately half way between the top and bottom of the float 23, and extends from one side to the opposing side of the float 23. A spring reel 26 is rotatably mounted on the axle 25. A line 27 extend from the spring reel 26 to the distal end 20 of the switch arm 19. A guide rod 28 may optionally be mounted on the housing 15. The guide rod 28 is encircled by a bow hook 29, which is attached to the float 23 by an arm 30. This assures that the float 23 will be held directly under the distal end 20 of the arm 19. The guide rod 28 may be attached to the inner surface 5 of the top 4, an inner surface 11 of a wall 10 or a lower 17 or side 18 surface of the housing 15. Even in the absence of the guide rod 28, the float 23 is assured of being held directly under the distal end 20 of the arm 19 as the spring reel 26 keeps the line 27 taut, and the taut line 27 will keep the float 23 in position.

The length of the line 28 is selected so that if ever the liquid 2 falls below the predetermined low point of the surface level 3, the float 23 will be left hanging in air and the weight of the line 27 will pull the switch arm 19 to the lowered position to close the circuit and activate the alarm 13.

According to the present invention, the housing 15 containing the activation mechanism 22 may be positioned inside the container 1 along an inner surface 5 of the top 4, along the inner surface 11 of one of the walls 10, or on the outside of the container 1 along the outer surface 6 of the top 4. When the activation mechanism 22 is positioned outside of the container 1, there must be an opening (not shown) in the top 4 to accomodate the passage of the line 28.

I claim:

1. An alarm system for use in containers having a top having inner and outer surfaces, a bottom having inner and outer surfaces, and at least one wall having an inner and outer surface, which container contains a liquid having a surface level which fluctuates between a predetermined high point and a predetermined low point; said system comprising:

an alarm means to be positioned outside of the container;

means for positioning a housing on a surface of the container above the predetermined high point of the surface level of the liquid;

a housing having an upper surface, a lower surface, and at least one side surface;

a single-pull switch arm having a distal end and a proximal end and which protrudes through a side surface of the housing, which single-pull switch arm has a raised position and a lowered position;

an activation mechanism contained within said housing, which activation mechanism is in contact with the proximal end of the single-pull switch arm, which activation mechanism contains an open electrical circuit which becomes closed when the single-pull switch arm is pulled down to its lowered position, and when said circuit is closed, said activation mechanism activates said alarm means;

a float suitable for floating on the surface level of the liquid, said float having an inner surface and an outer surface, said float having an axle attached thereto, said axle having a spring reel rotatably mounted thereon, and a line wrapped around the reel, said float being of such weight as to be capable of pulling the single-pull switch arm from the raised position to the lowered position;

an insulated electrical connector between said alarm means and said activation mechanism;

said line being attached to the distal end of the single-pull switch arm.

2. The alarm system of claim 1, wherein the alarm means is part of a unified security system.

3. The alarm system of claim 1, wherein said alarm means comprises an audible indicator.

4. The alarm system of claim 1, wherein said alarm means comprises a visible indicator.

5. The alarm system of claim 1, wherein the container is a commode reservoir, the alarm system is attached to the commode, and the electrical connector between the alarm means and the activation means passes from outside the reservoir to inside the reservoir between the top and a side of the reservoir.

6. The alarm system of claim 1, wherein a guide rod extends downwardly from a position on or near the housing, a bow hook encircles the guide rod, and the bow hook is connected to the float.

7. The alarm system of claim 1, wherein the float is spherical in shape, the reel is inside the float, and the float contains an opening for the passage of the line.

8. The alarm system of claim 1, wherein the float is a hexahedron, the reel is within the float, and the float contains an opening for the passage of the line.

9. The alarm system of claim 1, wherein the reel is mounted on an axle mounted on the outer surface of the float.

\* \* \* \* \*